United States Patent
Francis et al.

(10) Patent No.: US 9,707,904 B2
(45) Date of Patent: Jul. 18, 2017

(54) RECEPTACLE FOR ATTACHMENT TO A RIM

(71) Applicants: Michael Francis, Ottawa (CA); Donald Francis, Ottawa (CA)

(72) Inventors: Michael Francis, Ottawa (CA); Donald Francis, Ottawa (CA)

(*) Notice: Subject to any disclaimer, the term of this patent is extended or adjusted under 35 U.S.C. 154(b) by 52 days.

(21) Appl. No.: 14/011,550

(22) Filed: Aug. 27, 2013

(65) Prior Publication Data

US 2014/0054334 A1 Feb. 27, 2014

Related U.S. Application Data

(60) Provisional application No. 61/693,764, filed on Aug. 27, 2012.

(51) Int. Cl.
*B60R 11/06* (2006.01)

(52) U.S. Cl.
CPC .................................. *B60R 11/06* (2013.01)

(58) Field of Classification Search
CPC ........ B62D 43/00; B62D 43/05; B62D 43/05; B62D 43/005; B62D 43/007; B60R 11/06; B60S 5/00
USPC ....... 224/42.13, 42.14, 42.2, 42.24; 220/328, 220/327; 296/37.2; 206/304; 414/463
See application file for complete search history.

(56) References Cited

U.S. PATENT DOCUMENTS

| | | | |
|---|---|---|---|
| 1,684,160 A | 9/1928 | Tinker | |
| 4,498,614 A | 2/1985 | Guarr | |
| 5,118,017 A * | 6/1992 | Buck | 224/42.13 |
| 5,320,223 A * | 6/1994 | Allen | 206/372 |
| 5,429,285 A | 7/1995 | Kim | |
| 5,799,845 A * | 9/1998 | Matsushita | B60R 5/04 224/42.14 |
| 5,941,432 A * | 8/1999 | Spencer | B60K 15/06 141/2 |
| 6,026,999 A * | 2/2000 | Wakefield | 224/42.12 |
| 7,036,697 B2 | 5/2006 | Hwang et al. | |
| 7,487,952 B2 * | 2/2009 | Murphy | B62D 43/045 224/42.21 |
| 7,708,175 B2 * | 5/2010 | Edwards | 224/42.14 |
| 7,794,254 B2 * | 9/2010 | Marklove et al. | 439/271 |
| 2005/0040191 A1 * | 2/2005 | Hwang et al. | 224/42.14 |

FOREIGN PATENT DOCUMENTS

DE 19728912 A1 * 1/1999

* cited by examiner

*Primary Examiner* — Nathan J Newhouse
*Assistant Examiner* — Matthew Theis
(74) *Attorney, Agent, or Firm* — Loza & Loza, LLP; Razmig H. Messerian

(57) ABSTRACT

A receptacle for attachment to a rim is disclosed, being primarily used to store wheel lug nuts into said receptacle for storage and transportation of lug nuts with their associated wheels. The receptacle comprises a lid, a container and a securing pin. The container secures the wheel lug nuts, while the lid fastens onto the container to secure its contents, and meanwhile the securing pin secures the lid onto the container and ultimately onto the rim of the wheel, such that the wheel lug nuts are easily stored with the rim. This procedure is primarily performed before the winter or summer seasons, or when the wheels are changed for wheel leasing purposes or the transportation of wheels with their associated lug nuts, to ensure that the wheel lug nuts are never misplaced or lost.

18 Claims, 11 Drawing Sheets

RECEPTACLE FOR ATTACHMENT TO A RIM

CLAIM OF PRIORITY

The present application for patent claims priority to U.S. Provisional Patent Application No. 61/693,764 entitled "Receptacle for Attachment to a Rim" filed Aug. 27, 2012, the entire disclosure of which is hereby expressly incorporated by reference herein.

BACKGROUND

Field

The present invention relates to the field of receptacles, and more specifically to receptacles that contain objects such as automotive wheel nuts.

Background

Tire changing procedures and practices have become commonplace, especially in countries with cold winter climates. Before the first snowfall, and shortly after the last snowfall of the winter season, it is habitual for persons to change the tires on their cars, opting for a softer compound tire with a more open tread pattern for the winter months and a harder tread compound tire with a less open (finer) tread pattern for summer months. In fact, snow tires are required by law in some states and provinces, as is the case in the province of Quebec, Canada. To increase tire and rim longevity it is much easier and better that the summer rim be removed with the summer tire, such that both are replaced and reinstalled before and after the winter season. However, the requirement to change tires is not only limited to seasonal changes. Indeed, leasing tires and wheels has become a growing business in North America for drivers who want different wheels for aesthetic or business purposes. When removing the tires, one must first remove the wheel nuts. Often, the different wheels require a different nut so the off season wheel nuts (or bolts), as well as the corresponding locker nut, are stored with the tires themselves, or put in a location to be found when the rims need to be reinstalled on the vehicle. Since the rims are usually removed for many months, this leads to misplacing the wheel nuts (or bolts) and locker nut, or losing them altogether.

Many patents have already been devised, with specific purpose to store equipment or various objects, along with the rim of the vehicle by fastening a container to said rim. Such types of patents include U.S. Pat. No. 1,684,160 (Tinker), U.S. Pat. No. 4,498,614 (Guar), U.S. Pat. No. 5,118,017 (Buck), U.S. Pat. No. 5,429,285 (Kim) and U.S. Pat. No. 7,036,697 (Hwang et al.). Tinker's device provides for storage space within a spare tire rim, to be utilized for carrying various objects such as tools, accessories, etc. The container is secured to the rim by means of clamping the container around the rim. Guar also discloses a storage device for a spare tire. More specifically, Guar teaches a closed bottom container which fastens to the tire with the same fasteners that mount the wheel to the mounting bracket. Meanwhile, Buck discloses a storage device which mounts on the exterior wheel of a vehicle. Buck's device is mounted to the rim by means of a mounting shaft which extends outwardly from the rim and one can screw the container onto the mounting shaft and thus onto the rim. Kim discloses a receptacle which is again adapted to be secured to a rim of a vehicle Kim's device is mounted onto the rim by means of securing an external thread of a cover to an internal thread of the receptacle by the use of a bolt. Finally, Hwang's device discloses another type of storage device to fit inside of the rim of a vehicle, and attached thereon by means of its shape. Indeed, Hwang's invention does not specifically explain or teach of a means of secure the container within the rim, only that it fits snugly within it.

Unfortunately, all of these patents have similar problems, or other issues that need to be overcome. Namely, Tinker, Guar, Kim and Hwang's devices cannot apply to various shapes and sizes of rims. They are meant to fit within specific types of rims due to their method of attachment to said rims due to their own specific shape and size. Further, while they are meant to be mounted on the inside of a spare tire, Buck's device is specifically meant to be mounted to the outside of the rim. While this method may prove useful for easy access, it is completely inconvenient for storage purposes when rims are stored tightly together and stacked on top of each other. Another issue is that Guarr, Hwang and Tinker's devices do not use a single securing pin or bolt to secure their respective devices within the rims.

Overall, all five enumerated patents have problems that need to be overcome in order for a device to properly utilize a single securing pin to quickly, securely and conveniently fasten a container that can contain wheel nuts and the locker nut to rims that have been removed from a vehicle and stored and/or transported for a certain amount of time. The present device can overcome all of the aforementioned issues, and is described in further detail below.

SUMMARY

The present invention provides a receptacle for attachment to a rim.

In a first aspect, the present invention provides a receptacle for attachment to a rim comprising a container to store lug nuts, a lid connected to the container, a securing pin for connecting the lid to the container and to the rim.

BRIEF DESCRIPTION OF THE DRAWINGS

It will now be convenient to describe the invention with particular reference to one embodiment of the present invention. It will be appreciated that the drawings may relate to one embodiment of the present invention only and are not to be taken as limiting the invention.

DETAILED DESCRIPTION

The present invention will now be described more fully hereinafter with reference to the accompanying drawings, in which preferred and other embodiments of the invention are shown. No embodiment described below limits any claimed invention and any claimed invention may cover processes or apparatuses that are not described below. The claimed inventions are not limited to apparatuses or processes having all the features of any one apparatus or process described below or to features common to multiple or all of the apparatuses described below. It is possible that an apparatus or process described below is not an embodiment of any claimed invention. The applicants, inventors or owners reserve all rights that they may have in any invention claimed in this document, for example the right to claim such an invention in a continuing application and do not intend to abandon, disclaim or dedicate to the public any such invention by its disclosure in this document.

The terms "coupled" and "connected," along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

Figure 1:
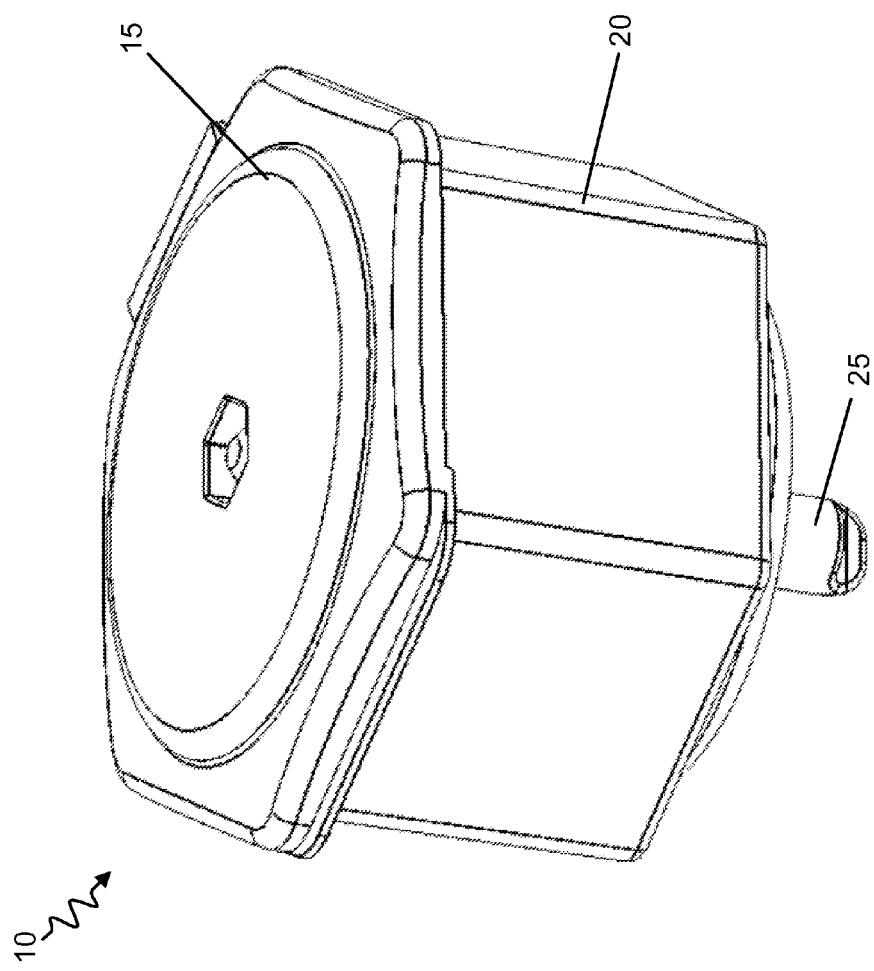
FIG. 1 is a perspective view of a receptacle for attachment to a rim, according to one embodiment of the present invention.

With reference to FIG. 1, a receptacle 10 for attachment to a rim is shown. The receptacle 10 is primarily comprised of a lid 15, a container 20 and a securing pin 25. The container 20 is meant to be a casing for lug nuts, as commonly found on the rims of most vehicles. A worker skilled in the relevant art would appreciate that lug nuts can include bolts, washers, lug nut key, or any similar type of item utilized to secure a rim onto a threaded wheel stud or wheel hub and ultimately onto an automobile or any of its associated parts. Once the lug nuts are inserted within the container 20, the lid 15, being pivotally-connected to said container 20, is rotated until it is fastened to the lid 15 by means of tab (not shown), creating a type of snap-fit and thus securing the lug nuts within said container 20. The lid 15 is further fastened to the container 20 by means of its connection to the securing pin 25, which is inserted into the container 20 and screwed into a nut (not shown) secured within a recess (not shown) of the lid 15. For easy storage, and in order for the lug nuts not to be lost, the receptacle 10 is securely fastened to a rim of a vehicle, said rim having just been removed from the vehicle. The connection between the receptacle 10 and the rim is explained in further detail below.

A worker skilled in the relevant art would appreciate that the receptacle 10 could be made of various materials, and could come in a variety of shapes and sizes, without departing from the scope and spirit of the invention, while still fitting to all shapes and sizes of rims of vehicles. The lid 15 could also be secured to the container 20 in a variety of ways, including a threaded connection, a connection involving screws or pins, or could even be secured through the rim itself. The lid 15 could also be pressed onto the container 20 through the use of an O-ring. The lid 15 could also be secured to the container 20 by means of a latch or lock or other similar device. One could also appreciate that a bolt could be inserted into a lid, through to the container and the threads of the bolt would screw into a nut on the other side of a rim. This concept would also be possible if the threads of the bolt and nut were inverted, such that the nut would be inserted into the bolt instead of vice-versa. Another concept could include a molded female thread on the lid such that there is no need for a nut, or could also include a locking snap integrated directly onto the lid which snaps onto the bolt and holds it firmly in place. Finally, other miscellaneous concepts could include elastic or hook-and-loop fastener (e.g., VELCRO®) cords that secure the lid to the container through the rim, or other means such as a buckle system, a chain system or a tying mechanism, each of which could fasten the lid onto the container and ultimately onto the rim.

Figure 2:
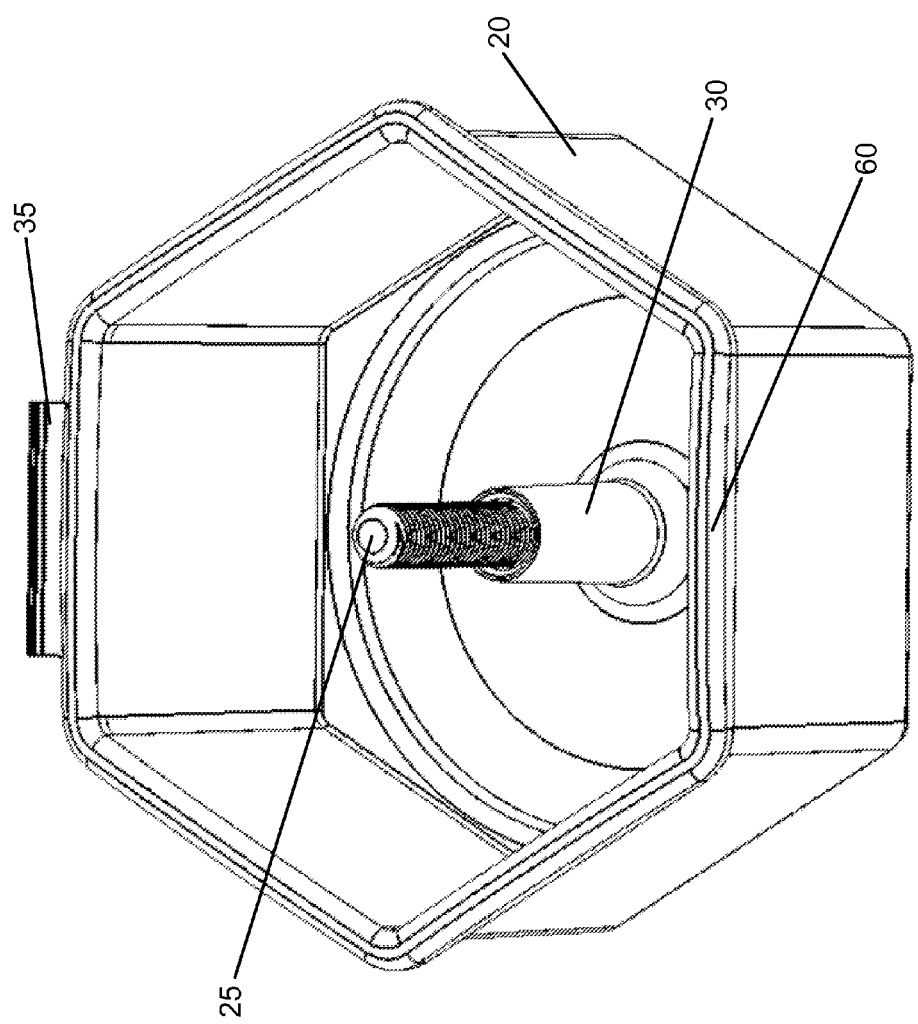
FIG. 2 is a top view of a receptacle without a lid according to one embodiment of the present invention.
Figure 3A:
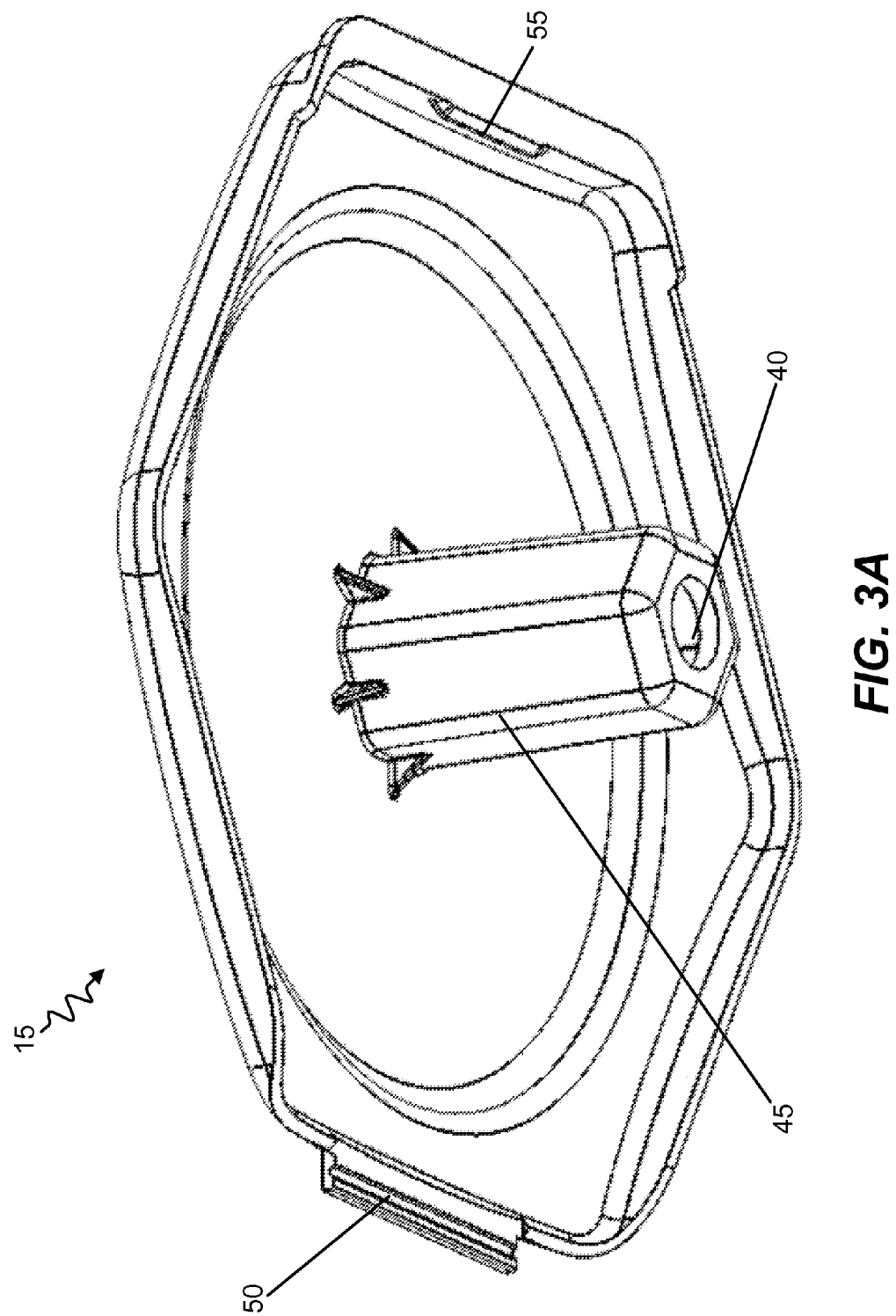
FIG. 3a is a lower perspective view of a lid of a receptacle, according to one embodiment of the present invention.
Figure 3B:
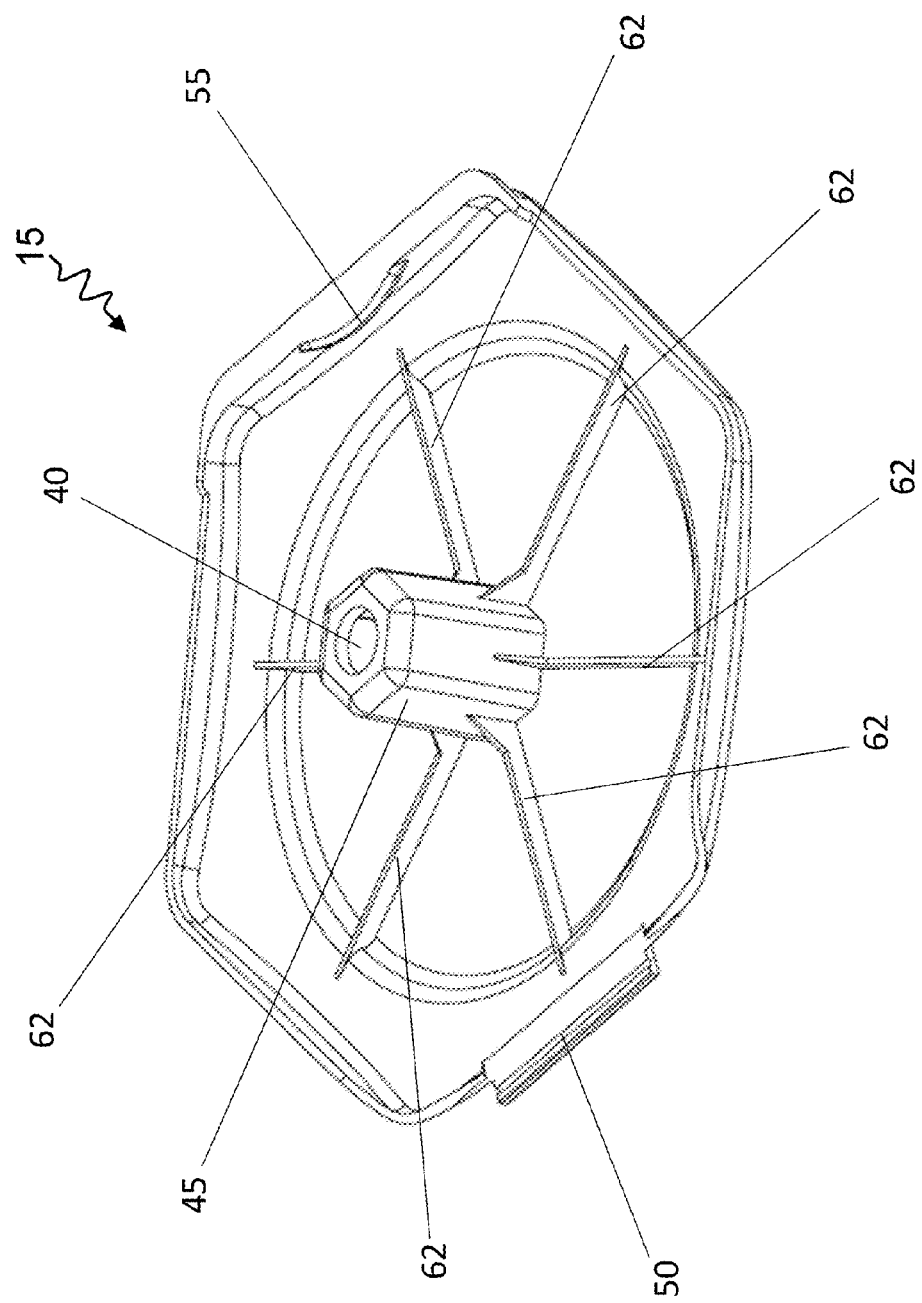
FIG. 3b is an upper perspective view of a lid of a receptacle, according to one embodiment of the present invention.

With reference to FIGS. 2, 3a, and 3b the interior of the container 20 and lid 15 are shown in greater detail. The securing pin 25 is shown inserted into, and extending out of, a protrusion 30 of the container 20. The protrusion 30 is meant to guide the securing pin 25 into an aperture 40 of a recess 45 of the lid 15. A nut (not shown) is secured within the recess 45 of the lid 15, such that the securing pin 25 can be easily threaded onto the nut (not shown). A hinge 35 is also shown which connects to a connecting member 50 of the lid 15 and serves to pivot said lid 15 around the container 20. The lid 15 is also comprised of a tab 55, which is located opposite the hinge 35, and serves to clasp onto a lip 60 of the container 20. Once the tab 55 is clasped onto the lip 60 of the container 20, the lid 15 is secured to the container 20 and remains closed until manually re-opened. As was previously explained, said lid 15 is further secured to the container 20 by the installation of securing pin 25 into the nut (not shown) located in the recess 45 of the lid 15. The container as shown can be of any shape as long as there is sufficient storage space within the container to store at least twenty nuts as commonly found to secure rims on a vehicle.

With specific reference to FIG. 3b and according to a second embodiment of the present device, the lid 15 as shown could include several ribs 62 that would run along the diameter of said lid 15, from one extremity of the perimeter of the lid 15 to the other, in order to strengthen and increase the sturdiness of the lid 15.

With specific reference to FIG. 2, the securing pin 25 is shown inserted into the protrusion 30 of the container 20. Instead of a threaded connection as the one proposed in the present embodiment, the securing pin 25 could involve a snap fit wherein the securing pin 25 simply snaps onto a nut positioned either on the lid 15 or is separate from the lid 15. A worker skilled in the relevant art would be familiar with various methods to couple the securing pin 25 to the container 20 and lid 15 such as a pressure fit or through the use of a locking pin wherein the locking pin is installed on the far end of the securing pin once the securing pin 25 has been secured through the lid 15. Such alternate embodiments were also described above.

Figure 4:
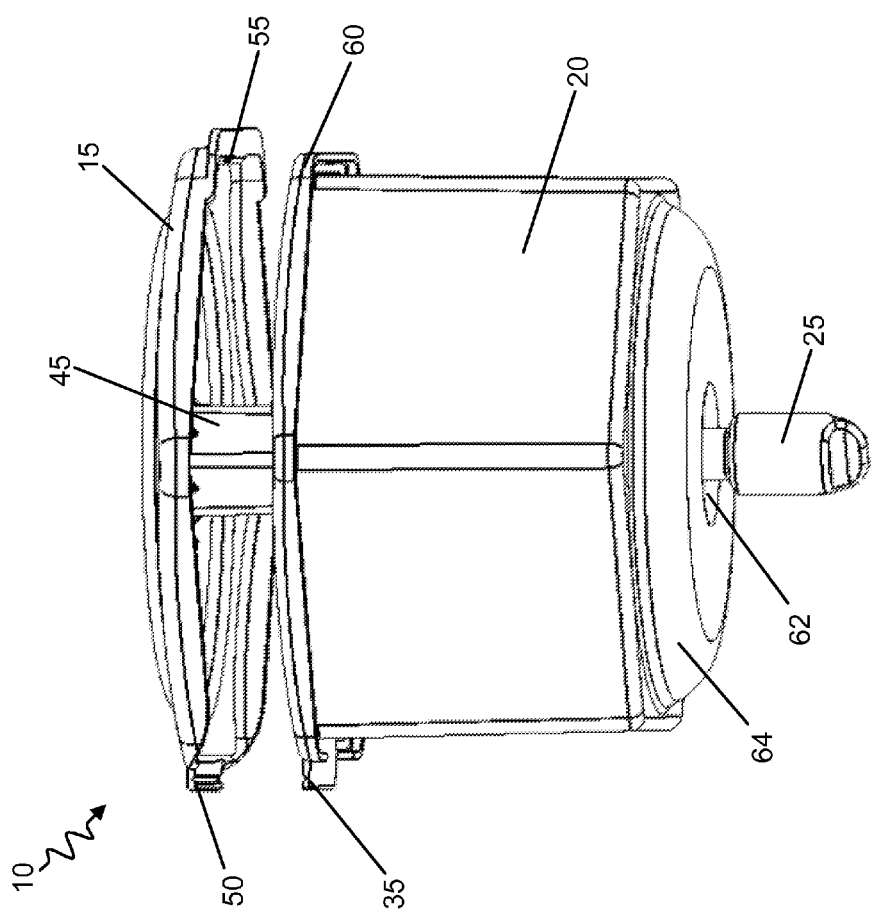
FIG. 4 is a side view of a receptacle for attachment to a rim with a lid partially removed from the receptacle, according to one embodiment of the present invention.

With reference to FIG. 4, the receptacle 10 is shown having the lid 15 unfastened from the container 20. The connecting member 50 of the lid 15 is shown in greater detail which is connected to the hinge 35 of the container 20, and together the hinge 35 and connecting member 50 create the pivotal connection between the container 20 and lid 15. The tab 55 is also shown in greater detail, which serves to clasp onto the lip 60 of the container. The securing pin 25 is shown completely inserted into an opening 62 of a lower surface 64 of the container 20. Said opening 62 connects to the protrusion (not shown) which guides the securing pin 25 to the aperture (not shown) of the recess 45 of the lid 15.

Figure 5:
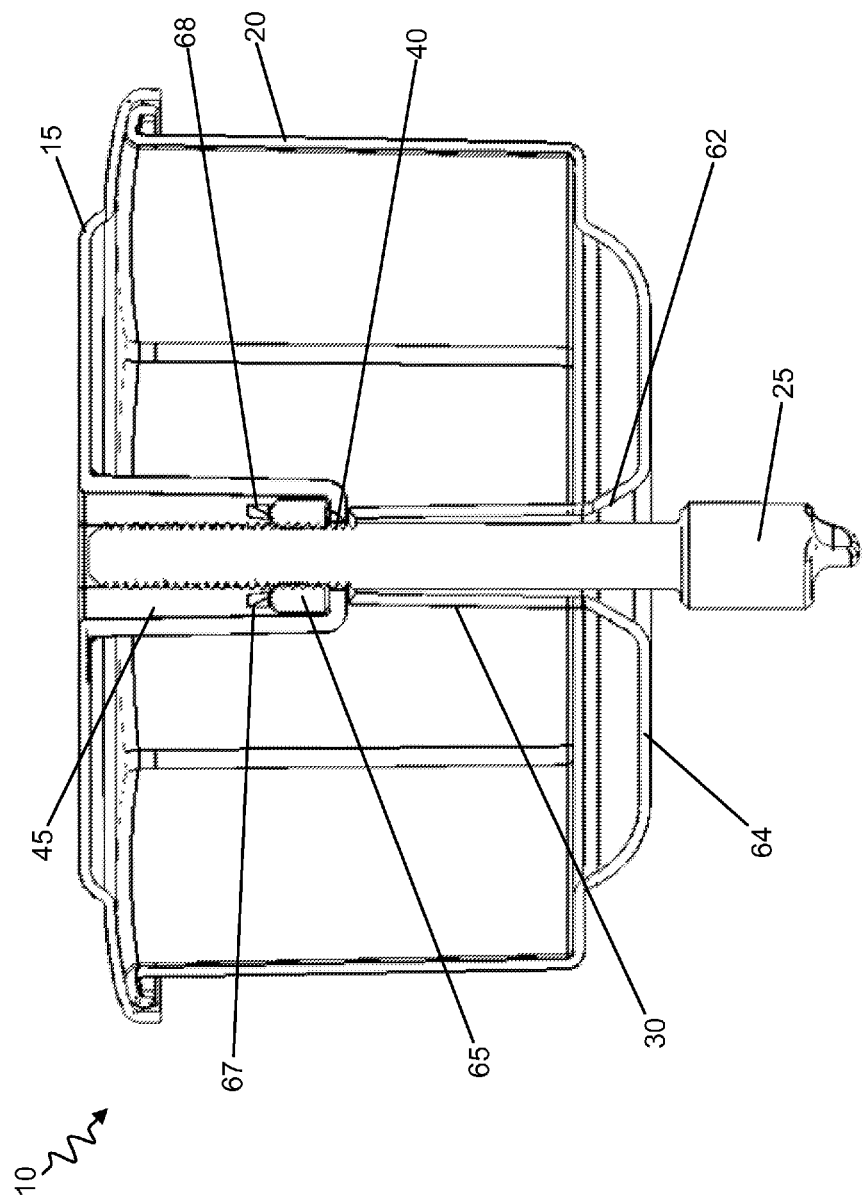
FIG. 5 is a cross sectional view of a receptacle for attachment to a rim, according to one embodiment of the present invention.

With reference to FIG. 5 the lid 15 is shown secured onto the container 20. The securing pin 25 is shown completely inserted into the opening 62 of the lower surface 64 of the container 20. Said securing pin 25 can also be seen through the aperture 40 and through the recess 45 of the lid 15, and threaded through the nut 65, nestled securely within said recess 45. Said nut 65 is secured within said recess 45 by means of abutments 67, 68. Said abutments 67, 68 have a sloping front face which allows the nut 65 to slide along the abutments 67, 68, ultimately locking the nut 65 in place and preventing said nut 65 from being removed from the recess 45. While FIG. 5 only shows two abutments 67, 68, the receptacle 10 could have three or more abutments in order to properly secure the nut 65 within said recess 45. The threaded connection between the securing pin 25 and the nut 65 further secures together the lid 15 to the container 20.

Figure 6:
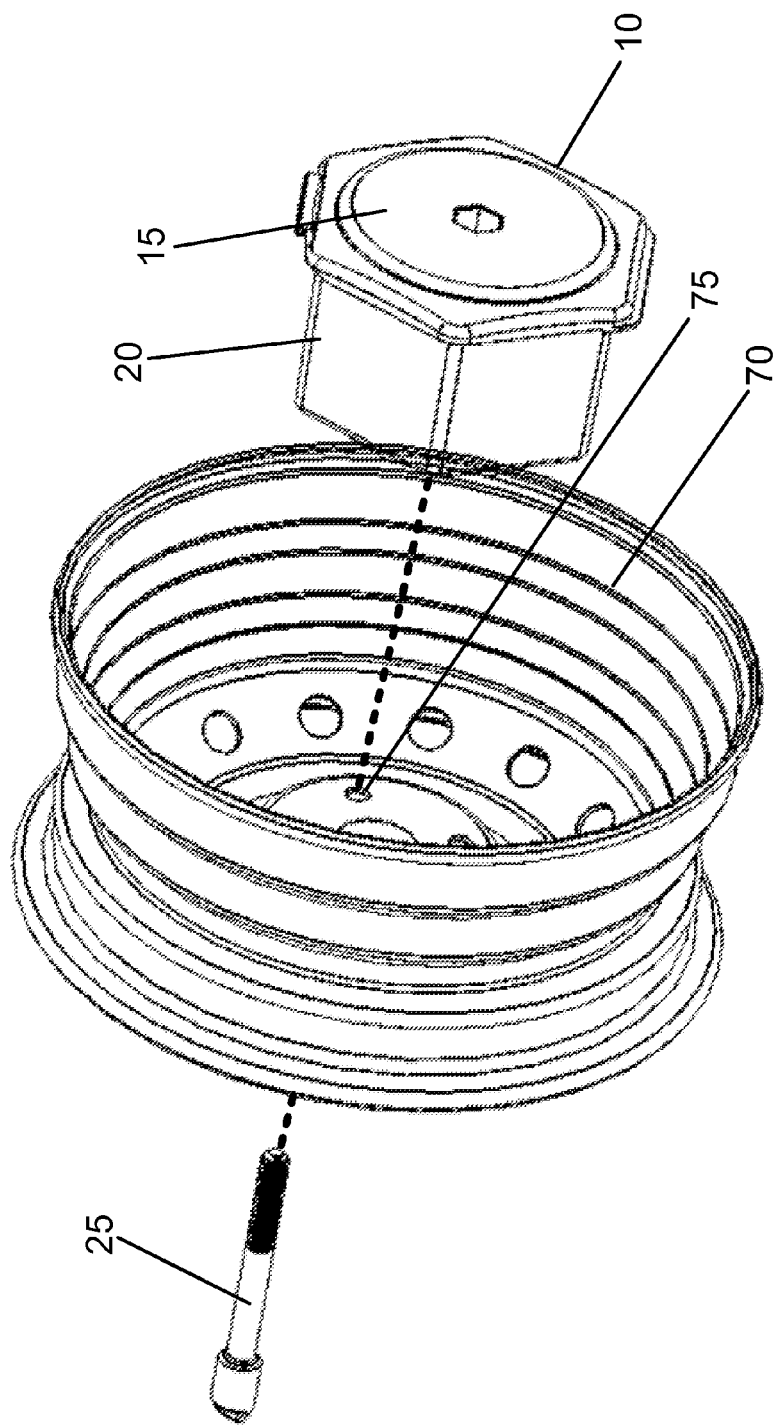
FIG. 6 is a perspective view of a receptacle for attachment to a rim, about to be secured onto a rim, according to one embodiment of the present invention.

With reference to FIGS. 5 and 6, in order to secure the receptacle 10 to a rim 70 of a vehicle, one must first insert the securing pin 25 within one of the existing wheel bolt apertures 75 of a rim 70. When the securing pin 25 is completely inserted within the wheel bolt aperture 75, the securing pin 25 must be aligned with the opening 62 of the container 20. Once aligned with said opening 62, the securing pin 25 is guided through the protrusion 30 of the container 20 and into the aperture 40 of the recess 45 of the lid 15. Once through the aperture 40, the securing pin 25 makes contact with the nut 65 and must be threaded through the nut 65. Once threaded, the lower surface 64 of the container 20 makes contact with the underside of the rim 70 in such a way so as to securely fasten the receptacle 10 to said rim 70.

With specific reference to FIG. 6, the receptacle 10 is shown being attached to a rim 70. The stippled line serves to show the alignment between the opening (not shown) of the container 20 and the securing pin 25. As was explained above, the securing pin 25 is inserted into a wheel bolt aperture 75 of the rim 70, and connects with the opening (not shown) of the container 20 and ultimately to the nut (not shown) of the lid 15.

Figure 7:
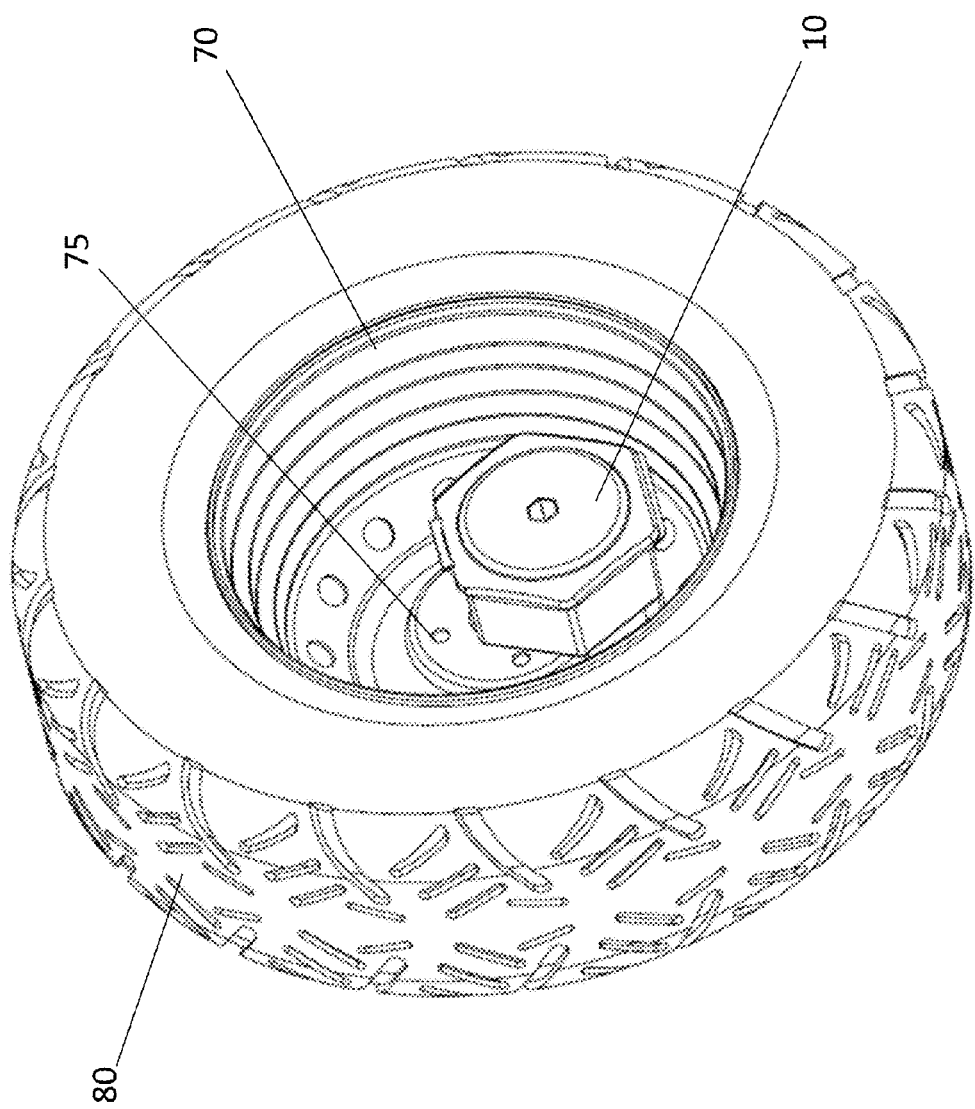
FIG. 7 is a perspective view of a receptacle for attachment to a rim, secured onto a rim which is in turn fastened onto a tire, according to one embodiment of the present invention.
Figure 8:
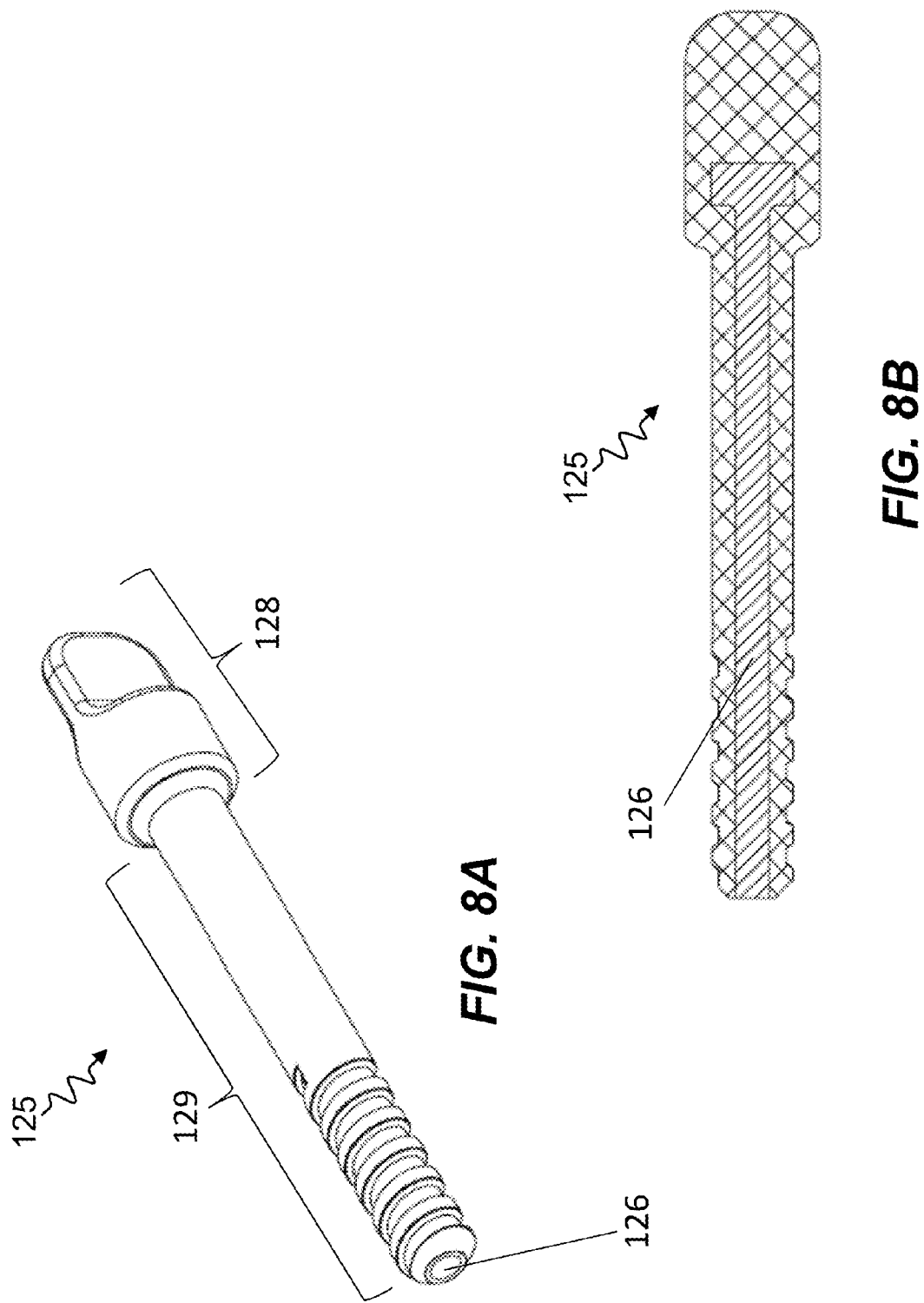
FIG. 8a is a perspective view of a securing pin for a receptacle for attachment to a rim, according to a second embodiment of the present invention.
FIG. 8b is a cross-sectional view of a securing pin for a receptacle for attachment to a rim, according to a second embodiment of the present invention.
Figure 9:
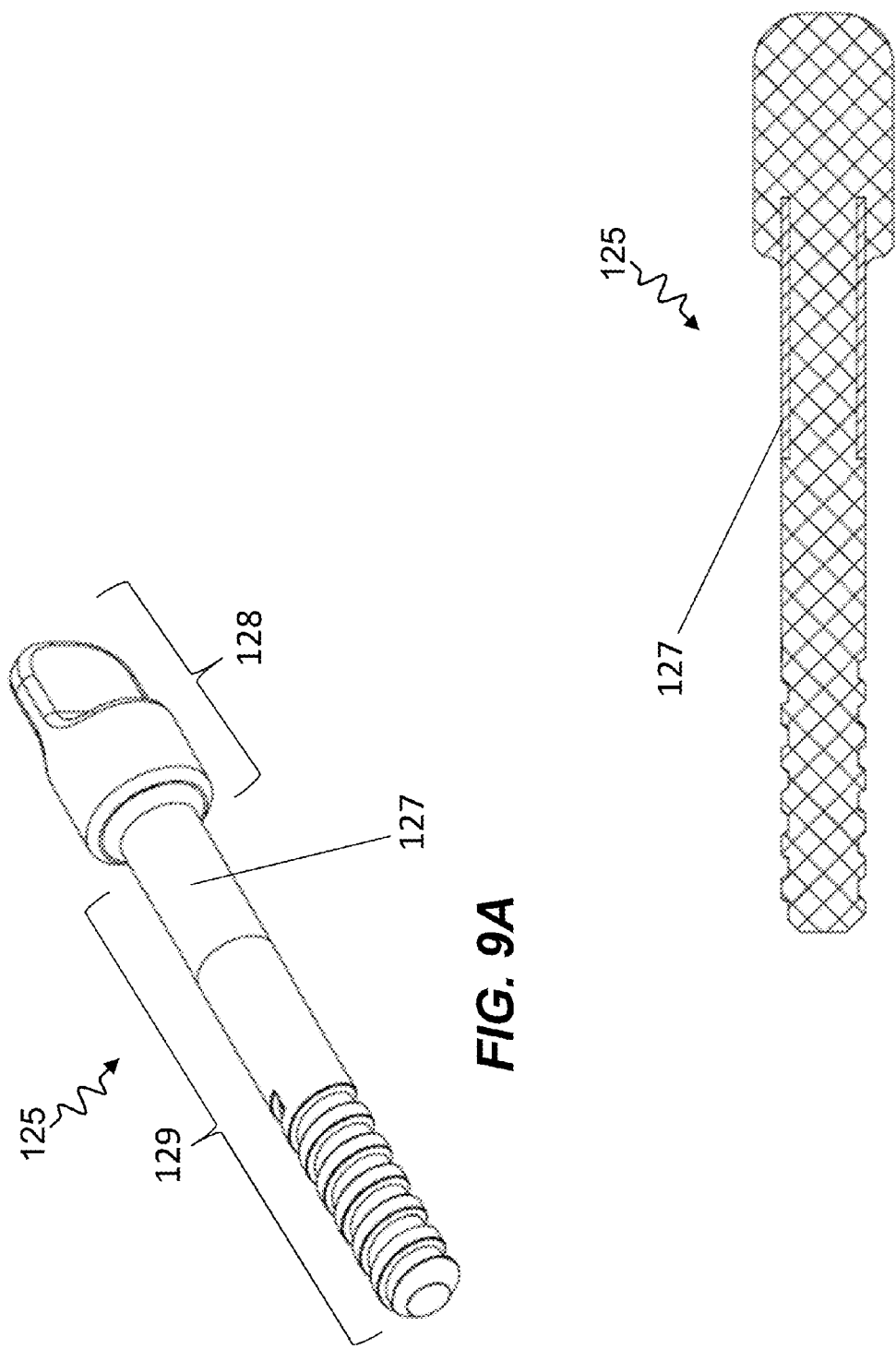
FIG. 9a is a perspective view of a securing pin for a receptacle for attachment to a rim, according to a third embodiment of the present invention.
FIG. 9b is a cross-sectional view of a securing pin for a receptacle for attachment to a rim, according to a third embodiment of the present invention.

With reference to FIG. 7, the receptacle 10 is shown fastened to the rim 70 of a tire 80 through a wheel bolt aperture 75. When stored for long periods of time, the receptacle 10 is easily accessible within the tire rim 70 of the tire 80 and it greatly decreases the chance of the wheel nuts being lost or misplaced.

With reference to FIGS. 8a, 8b, 9a and 9b, a securing pin 125 is shown according to a second embodiment of the present device. The securing pin 125 is comprised of a threaded end 129 and an operating end 128. The operating end 128 has to be wider than any diameter commonly found on a wheel bolt aperture (not shown), while the threaded end 129 must be narrower than said wheel bolt aperture (not shown) in order for the securing pin 125 to secure the container (not shown) onto a rim. Specifically, in this second embodiment, said securing pin 125 is stronger and sturdier than the first embodiment of the present device, by means of a strengthening element 126 or strengthening sleeve 127. Said strengthening element 126 is a metal pin that is inserted within the securing pin 125, while the strengthening sleeve 127 is a metal envelope that is fastened around an upper portion of the securing pin 125 in order to reinforce it should the receptacle (not shown) be dropped or handled roughly. Indeed, the strengthening element 126 and strengthening sleeve 127 are meant to prevent the securing pin 125 from breaking, especially under very cold temperatures. A worker skilled in the relevant art would appreciate that the securing pin 125 could be comprised of other strengthening elements to make said securing pin 125 sturdier, or that the securing pin 125 could be fabricated of die cast metal, polyurethane or silicone, or a fiber-reinforced polymer without departing from the spirit and scope of the present invention.

Figure 10:
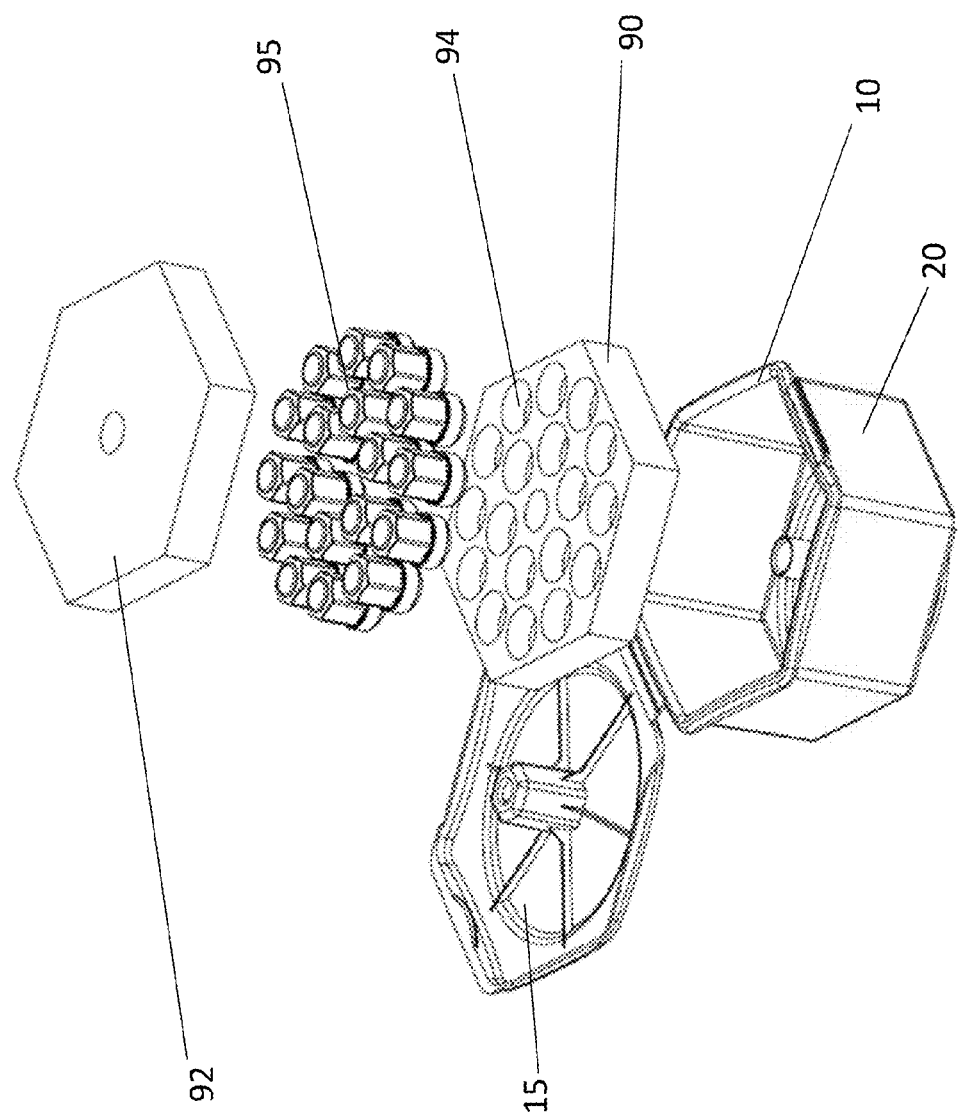
FIG. 10 is an exploded view of a receptacle for attachment to a rim, along with first and second foam inserts and accompanying lug nuts, according to a first embodiment of the present invention.

With reference to FIG. 10 and according to a first embodiment of the present design, first and second foam inserts 90, 92 are shown for insertion into the receptacle 10. First foam insert 90 is comprised of several smaller cavities 94 meant to secure lug nuts 95 within said cavities 94. Indeed, the cavities 94 of the first foam insert 90 are shaped in such a way so as to releasably secure the lug nuts 95 such that they do not move around within the receptacle 10. In order to further restrict the movement of the lug nuts 95, the second foam insert 92 is inserted over the lug nuts 95 such that they become trapped in between the apertures 94 of the first foam insert 90 and the second foam insert 92. Once the lug nuts 95 have been sandwiched in between the first and second foam inserts 90, 92 of the container 20, the lid 15 is pivoted and is snap-fitted onto said container 20. A worker skilled in the relevant art would appreciate that while eighteen lug nuts 95 are shown, the container could hold a smaller or larger finite number of lug nuts 95, up to a maximum amount of lug nuts 95 as would be physically possible by virtue of the size of the container 20 without restricting the closure of the lid 15.

Although the invention has been described above by reference to certain embodiments of the invention, the invention is not limited to the embodiments described above. Modifications and variations of the embodiments described above will occur to those skilled in the art in light of the above teachings. Moreover, with respect to the above description, it is to be repulsed that the optimum dimensional relationships for the component members of the present invention may include variations in size, material, shape, form, funding and manner of operation.

While the present embodiments of this invention have been described, it should be understood that various changes, adaptations and modifications may be made therein without departing from the spirit of the invention and the scope of the appended claims. Thus the scope of the invention should be determined by the appended claims and their legal equivalents, rather than by the examples given.

What is claimed is:

1. A receptacle for attachment to a rim, the receptacle comprising:
   a container having at least one side surface and a lower surface that together define a cavity of the container that is adapted to store lug nuts, the lower surface including a protrusion that extends into the cavity giving the cavity a substantially toroidal shape;
   a lid adapted to connect to the container and cover an open end of the container opposite the lower surface of the container, said lid including a recess that extends into the cavity toward the protrusion, the recess including at least two abutments having a sloping front face, the abutments adapted to lock the nut within the recess;

a nut positioned within the recess; and a securing pin having a first end and a second end, the second end adapted to pass through a wheel bolt aperture of a wheel rim, the second end passing through an opening of the protrusion and an aperture of the recess to couple with and secure to the nut, wherein the first end of the securing pin is adapted to secure against a first side of the wheel bolt aperture and the second end of the securing pin is adapted to secure the container, the lid, and the nut to each other on a second side of the wheel bolt aperture.

2. The receptacle of claim 1, wherein the lid includes a tab.

3. The receptacle of claim 2, wherein the container includes a lip for engagement with the tab.

4. The receptacle of claim 1, wherein the lid includes a connecting member.

5. The receptacle of claim 4, wherein the container includes a hinge for engagement with the connecting member.

6. The receptacle of claim 1, wherein the securing pin includes a strengthening sleeve.

7. The receptacle of claim 1, wherein the securing pin includes a strengthening member.

8. The receptacle of claim 1, further comprising:
at least one foam insert for securing the lug nuts, the foam insert adapted to be positioned within the cavity.

9. The receptacle of claim 1, wherein the second end of the securing pin is threaded.

10. The receptacle of claim 1, wherein the lid is pivotally connected to the container.

11. The receptacle of claim 1, wherein the lid has a threaded connection to the container.

12. The receptacle of claim 1, wherein the lid has a snap-fit connection to the container.

13. The receptacle of claim 1, wherein the opening of the protrusion is at a distal end of the protrusion extending away from the lower surface of the container, and the aperture of the recess is at a distal end of the recess extending toward the distal end of the protrusion.

14. The receptacle of claim 1, wherein the first end of the securing pin has a diameter that is wider than the second end of the securing pin allowing the second end to pass through the wheel bolt aperture and preventing the first end from passing through the wheel bolt aperture thereby securing the first end of the securing pin against the first side of the wheel bolt aperture.

15. The apparatus of claim 14, further comprising:
at one foam insert for securing the lug nuts, the foam insert adapted to be positioned within the cavity.

16. The apparatus of claim 14, wherein the first end of the securing pin has a diameter that is wider than the second end of the securing pin.

17. The apparatus of claim 14, wherein the securing pin includes at least one of a strengthening sleeve and/or a strengthening member.

18. An apparatus for attachment to a wheel rim, the apparatus comprising:
a container having a plurality of side surfaces and a lower surface that together define a cavity of the container that is adapted to store lug nuts, the plurality of side surfaces orthogonal to the lower surface, the lower surface including an elongated protrusion that extends into the cavity, the protrusion including an opening at a distal end of the protrusion extending away from the lower surface of the container;

a lid adapted to couple to an open end of the container opposite the lower surface of the container, the lid including an elongated recess that extends into the cavity toward the protrusion, the recess including an aperture at a distal end of the recess extending away from an upper surface of the lid, the distal end of the recess extending toward the distal end of the protrusion the recess including at least two abutments having a sloping front face, the abutments adapted to lock the nut within the recess;

a nut positioned within the recess; and a securing pin having a first end and a second end, the second end adapted to pass through a wheel bolt aperture of a wheel rim, the second end passing through the opening of the protrusion and the aperture of the recess to secure to the nut, wherein the first end of the securing pin is adapted to secure against a first side of the wheel bolt aperture and the second end of the securing pin is adapted to secure the container, the lid, and the nut to each other on a second side of the wheel bolt aperture.

* * * * *